US011328282B2

(12) United States Patent
Cheng

(10) Patent No.: US 11,328,282 B2
(45) Date of Patent: May 10, 2022

(54) METHOD AND SYSTEM FOR IDENTIFYING GOODS OF INTELLIGENT SHOPPING CART

(71) Applicant: XIAN CHAOHI NET TECHNOLOGY CO., LTD., Shaanxi (CN)

(72) Inventor: Kun Cheng, Shaanxi (CN)

(73) Assignee: XIAN CHAOHI NET TECHNOLOGY CO., LTD., Shaanxi (CN)

( * ) Notice: Subject to any disclaimer, the term of this patent is extended or adjusted under 35 U.S.C. 154(b) by 415 days.

(21) Appl. No.: 16/067,025

(22) PCT Filed: Jan. 4, 2017

(86) PCT No.: PCT/CN2017/000102
§ 371 (c)(1),
(2) Date: Jun. 28, 2018

(87) PCT Pub. No.: WO2018/126345
PCT Pub. Date: Jul. 12, 2018

(65) Prior Publication Data
US 2021/0209575 A1 Jul. 8, 2021

(51) Int. Cl.
*G06Q 20/20* (2012.01)
*G01G 19/414* (2006.01)
(Continued)

(52) U.S. Cl.
CPC .......... *G06Q 20/208* (2013.01); *G01G 19/08* (2013.01); *G01G 19/4144* (2013.01);
(Continued)

(58) Field of Classification Search
CPC .......... G06Q 30/0241; G06Q 30/0222; G06Q 30/0603; G06Q 20/32; G06Q 30/0629;
(Continued)

(56) References Cited

U.S. PATENT DOCUMENTS

| 2009/0140850 A1* | 6/2009 | Kangas | G06Q 30/00 340/539.1 |
| 2012/0127316 A1* | 5/2012 | Kundu | G06Q 20/00 348/150 |
| 2012/0284132 A1* | 11/2012 | Kim | G07G 1/0081 705/20 |

FOREIGN PATENT DOCUMENTS

| CN | 104787102 A | * | 7/2015 |
| CN | 106204226 A | | 12/2016 |

(Continued)

*Primary Examiner* — Thien T Mai
(74) *Attorney, Agent, or Firm* — Cantor Colburn LLP

(57) ABSTRACT

The present disclosure discloses a method and a system for identifying goods of intelligent shopping cart. The method comprises: reading bar code information of a to-be-purchased goods and obtaining corresponding prestored goods information; continuously detecting and obtaining a total goods weight $m_{n+1}$ in the shopping cart, and comparing the total goods weight $m_{n+1}$ with a total goods weight $m_n$ acquired after a previous purchasing action is completed, to obtain a variation $m_A$ of the total goods weight. According to the method of the present disclosure, when a customer puts a goods in the shopping cart in the shopping course, the correct goods is automatically identified and recorded in a shopping list, then the customer can directly settle the account after completing the shopping, accordingly a lot of time for the customers to wait for the settlement is saved.

9 Claims, 3 Drawing Sheets

(51) Int. Cl.
*G06K 7/10* (2006.01)
*G06T 7/194* (2017.01)
*G06T 7/70* (2017.01)
*G01G 19/08* (2006.01)
*G06K 7/14* (2006.01)
*G06Q 30/06* (2012.01)
*G07G 3/00* (2006.01)

(52) U.S. Cl.
CPC ....... *G06K 7/10861* (2013.01); *G06K 7/1413* (2013.01); *G06Q 30/0633* (2013.01); *G06T 7/194* (2017.01); *G06T 7/70* (2017.01); *G07G 3/00* (2013.01); *G06K 2007/10504* (2013.01); *G06T 2207/20121* (2013.01); *G06T 2207/30232* (2013.01)

(58) Field of Classification Search
CPC ........... G06Q 30/0635; G06Q 30/0643; G06Q 20/202; G06Q 30/0255; G06Q 30/0201; G06Q 30/0256; G06Q 30/0623; G06Q 20/3224; G06Q 30/018; G06Q 30/08; G06Q 20/18; G06Q 10/083; G06Q 20/042; G06Q 20/327; G06Q 30/0254; G06Q 30/0261; G06Q 30/0281; G06Q 30/0631; G06Q 40/02; G06Q 20/3223; G06Q 20/343; G06Q 20/3552; G06Q 30/00; G06Q 99/00; G06Q 20/204; G06Q 50/01; G06Q 20/04; G06Q 20/16; G06Q 20/3221; G06Q 20/3274; G06Q 30/0243; G06Q 50/16; G06Q 10/00; G06Q 10/047; G06Q 10/0875; G06Q 20/36; G06Q 20/4016; G06Q 30/01; G06Q 30/0224; G06Q 30/0234; G06Q 30/0238; G06Q 30/0251; G06Q 10/20; G06Q 20/367; G06Q 20/401; G06Q 20/40145; G06Q 30/0273; G06Q 50/10; G06Q 50/30; G06Q 10/06; G06Q 10/063114; G06Q 10/0639; G06Q 30/0202; G06Q 30/0208; G06Q 30/0276; G06Q 30/0283; G06Q 30/0617; G06Q 10/02; G06Q 10/0631; G06Q 10/06311; G06Q 10/0637; G06Q 10/0837; G06Q 10/1091; G06Q 10/1093; G06Q 20/047; G06Q 20/10; G06Q 20/123; G06Q 20/201; G06Q 20/203; G06Q 20/209; G06Q 20/227; G06Q 20/325; G06Q 20/326; G06Q 20/3278; G06Q 20/34; G06Q 20/382; G06Q 20/3825; G06Q 20/405; G06Q 30/016; G06Q 30/0203; G06Q 30/0206; G06Q 30/0213; G06Q 30/0268; G06Q 30/0277; G06Q 30/0278; G06Q 30/0282; G06Q 30/0607; G06Q 30/0613; G06Q 30/0625; G06Q 30/0637; G06Q 40/12; G06Q 50/26; G06Q 50/28; G06Q 50/32; G06K 7/1417; G06K 19/06037; G06K 9/6201; G06K 9/00671; G06K 17/00; G06K 7/10722; G06K 9/00771; G06K 19/14; G06K 9/00369; G06K 19/06028; G06K 2007/10524; G06K 7/015; G06K 7/10732; G06K 7/1413; G06K 9/00302; G06K 9/00664; G06K 9/18; G06K 9/6215
See application file for complete search history.

(56) References Cited

FOREIGN PATENT DOCUMENTS

| CN | 106408369 A | * | 2/2017 | ........... B62B 5/0096 |
|---|---|---|---|---|
| CN | 106408369 A | | 2/2017 | |
| GB | 2401461 A | * | 11/2004 | ............... G07F 7/02 |

* cited by examiner

METHOD AND SYSTEM FOR IDENTIFYING GOODS OF INTELLIGENT SHOPPING CART

TECHNICAL FIELD

The present disclosure relates to a technical field of intelligent shopping cart and for identifying articles, and particularly to a method and system for identifying goods of intelligent shopping cart.

BACKGROUND

In decades from the early 1990s to present, people have been gradually accustomed to shopping in supermarkets. Rammed supermarkets, convenient stores and shopping malls (hereinafter referred to as "supermarkets" for short) are found in the whole urban area and various communities of each city in the country with the downtown as a center point. As a new type of business, the supermarkets are displacing the traditional business such as corner store, department store and self-employed medium-sized shop in the past. The functions of the supermarkets are gradually becoming diversified and all-sided, and surprisingly, even some goods only can be bought in the supermarkets.

To go to the supermarket is supposed to be convenient and efficient, but as more and more customers shop in the supermarket, the originally efficient shopping mode incurring more and more complaints of customers since it requires a long period of queuing time to settle. Therefore, a self-checkout system is adopted in some supermarkets and stores, however since there is no loss prevention monitoring design for the self-checkout system, it is abandoning due to the stealing and loss of goods. Up to now, there is no technology has yet been available in the market to perfectly solve the problem of queuing up due to long-wait settlement.

SUMMARY

A technical problem to be solved by the present disclosure is to provide a method for identifying goods of intelligent shopping cart, to address the low efficiency of existing supermarket settlement systems.

In order to solve the above technical problem, the present disclosure provides a method for identifying goods of intelligent shopping cart which is used in a smart shopping cart system with the integration of scanning a code of a goods to recognize the goods, weight sensing and tracking and analyzing the goods upon image acquisition. The method includes the following steps:

reading bar code information of a to-be-purchased goods and obtaining corresponding prestored goods information, the prestored goods information at least including: a standard weight $m0$ of the to-be-purchased goods;

continuously detecting and obtaining a total goods weight $mn+1$ in the shopping cart, and comparing the total goods weight $mn+1$ with a total goods weight $mn$ acquired after a previous purchasing action is completed, to obtain a variation $m\Delta$ of the total goods weight, wherein action information performed to the to-be-purchased goods can be judged through the variation $m\Delta$, and the action information includes: putting the to-be-purchased goods into the shopping cart, taking the to-be-purchased goods out from the shopping cart or performing no operation;

comparing an absolute value $|m\Delta|$ of the variation of the total goods weight with the standard weight $m0$:

if $|m\Delta|$ conforms to $m0$, the obtained prestored goods information is consistent with the to-be-purchased goods, and the judged action information being correct;

if $|m\Delta|$ fails to conform to $m0$, the obtained prestored goods information is inconsistent with the to-be-purchased goods, and/or the judged action information being incorrect.

Furthermore, the method further includes: providing on the shopping cart a weight sensor for continuously detecting the total goods weight in the shopping cart in real time, wherein the weight sensor, before acquiring the total goods weight, firstly determines a movement state of the shopping cart, and then calculates an actual total goods weight using a corresponding algorithm; and starting to perform, after the bar code information of the to-be-purchased goods is acquired, video recording for the shopping cart, and tracking and analyzing a goods path, wherein the video recording is stopped when it is judged according to the variation of the total goods weight in the shopping cart that the to-be-purchased goods has been put into the shopping cart; alternatively, the recording is stopped when a pre-set tracking time is ended.

Furthermore, a specific algorithm for the weight sensor to acquire the total goods weight is as follows:

3-1) when the shopping cart is stationary, a value acquired by the weight sensor is just an actual total goods weight;

3-2) when the shopping cart moves stably, the data which appearance frequency is highest is taken as the actual total goods weight;

3-3) when the shopping cart moves vigorously, values acquired by the weight sensor cannot be taken as the actual total goods weight;

3-4) when the shopping cart turns from a movement state to be stationary, drop off the data detected in the movement state and the value detected form the stationary state is taken as the actual total goods weight.

Furthermore, a value range of the $m_0$ is $m_{min} \sim m_{max}$, wherein if $|m_\Delta|$ is within the value range $m_{min} \sim m_{max}$ of the $m_0$, then it is judged that $|m_\Delta|$ conforms to $m_0$; if $|m_\Delta|$ is outside the value range $m_{min} \sim m_{max}$ of the $m_0$, then it is judged that $|m_\Delta|$ fails to conform to $m_0$.

Furthermore, in a condition that that $|m_\Delta|$ conforms to $m_0$, for a to-be-purchased goods judged as being putting into the shopping cart, prestored information thereof is stored in a shopping list, and for a to-be-purchased goods judged as being taken out from the shopping cart, it is prompted to delete prestored information of the to-be-purchased goods from the shopping list.

Furthermore, in a condition that that $|m_\Delta|$ does not conform to $m_0$, an error is prompted, and the shopping cart is automatically locked.

Furthermore, when it is judged according to the detected variation of the total goods weight in the shopping cart that the to-be-purchased goods has been taken out from the shopping cart, but bar code information of the to-be-purchased goods is not acquired while the variation is detected or within a set period of time thereafter, the shopping cart is locked, and it is prompted to scan a code of the to-be-purchased goods, and the same is deleted from the shopping list, and after the bar code information is acquired or the to-be-purchased goods is put back into the shopping cart, the shopping cart is unlocked.

Furthermore, when it is judged according to the detected variation of the total goods weight in the shopping cart that the to-be-purchased goods has been put into the shopping cart, but the bar code information of the to-be-purchased goods is not acquired before the variation is detected, the shopping cart is locked and it is prompted to take out the to-be-purchased goods, and the shopping cart is unlocked after the goods is taken out.

Furthermore, in a precondition that the total goods weight in the shopping cart remains unchanged, when the bar code information of the to-be-purchased goods is read, and a corresponding standard weight is obtained, it is prohibited reading the bar code information within a set period of waiting time; when it is detected that a variation of an increase of the total goods weight in the shopping cart conforms to the standard weight, it is judged that the to-be-purchased goods is put into the shopping cart, and prestored information of the to-be-purchased goods is stored in the shopping list.

Based on the above mentioned, a system for identifying goods of intelligent shopping cart is further provided in the present disclosure, including: an initialization module, a weighing module, and a comparison and calculation module, wherein the initialization module is configured to read bar code information of a to-be-purchased goods and obtain corresponding prestored goods information, wherein the prestored goods information at least includes: a standard weight $m_0$ of the to-be-purchased goods;

the weighing module is configured to continuously detect and obtain a total goods weight $m_{n+1}$ in the shopping cart, compare the total goods weight $m_{n+1}$ with a total goods weight $m_n$ acquired after a previous purchasing action is completed, to obtain a variation $m_A$ of the total goods weight, wherein action information performed to the to-be-purchased goods can be judged through the variation $m_A$, the action information including: putting the to-be-purchased goods into the shopping cart, taking the to-be-purchased goods out from the shopping cart or performing no operation;

the comparison and calculation module is configured to compare an absolute value $|m_A|$ of the variation of the total goods weight with the standard weight $m_0$:

if $|m_A|$ conforms to $m_0$, the obtained prestored goods information is consistent with the to-be-purchased goods, and the judged action information is correct;

if $|m_A|$ does not conform to $m_0$, the obtained prestored goods information is inconsistent with the to-be-purchased goods, and/or the judged action information is incorrect.

The Beneficial effects of the present disclosure are as follows:

1) with the method of the present disclosure, when a customer himself puts a goods in the shopping cart in the shopping course, a system algorithm performs automatic identification, and records the correct goods in the shopping list, then the customer can directly settle the account after completing the shopping, accordingly a lot of time for the customers to wait for the settlement is saved, moreover, the customer flow in the supermarket is increased, meanwhile, cashiers are decreased, an operating cost of the supermarket is reduced, and incoming channels are increased;

2) in the system of the present disclosure, a third-party API interface is used to form seamless connection with a supermarket system, facilitating system popularization;

3) no matter the shopping cart is in the stationary state or the moving state, the total goods weight in the shopping cart always can be rapidly and accurately acquired;

4) by collecting weight information of goods in the smart shopping cart through the weight sensor, calling data of goods information recorded in advance in a server through a scanner, collecting goods image information through a monitoring means, and tracking the goods movement track through the image information and comparing the weights, the goods purchased can be double checked, ensuring the goods identification result to be accurate;

5) in experiments of object tracking of smart shopping carts with the existing image tracking algorithms, due to variations of shape, dimension and pose of the object, the object is hard to track, meanwhile, types of purchasing are quite plentiful, thus there is hardly an inherent characteristic to be extracted, then the probability of accurately tracking an object is quite low. However, the algorithm for identifying information of goods of intelligent shopping cart in the present disclosure can achieve good tracking from videos in cases of illumination change, shielding, non-rigid deformation, motion blur, disordered background, rotation and so on, such that a success rate of the object tracking of the shopping cart reaches 99%, meanwhile, an operation speed of the object tracking algorithm is quicker than the conventional deep learning algorithm by multiple order, and achieve embedded real-time object tracking.

DETAILED DESCRIPTION OF THE EMBODIMENTS

Now the principle of the present disclosure will be described with reference to some exemplary examples. It can be understood that these examples are merely described for the purpose of explanation and assisting a person skilled in the art in understanding and implementing the present disclosure, rather than recommending any limitation to the scope of the present disclosure. Contents in the present disclosure described herein can be implemented in various manners in addition to manners described below.

As described herein, terms "comprise" and any variants thereof can be construed as open terms, which mean "comprise but not limited to". Term "based on" can be construed as "at least partially based on". Term "one example" can be construed as "at least one example". Term "another example" can be construed as "at least one another example".

Figure 1:
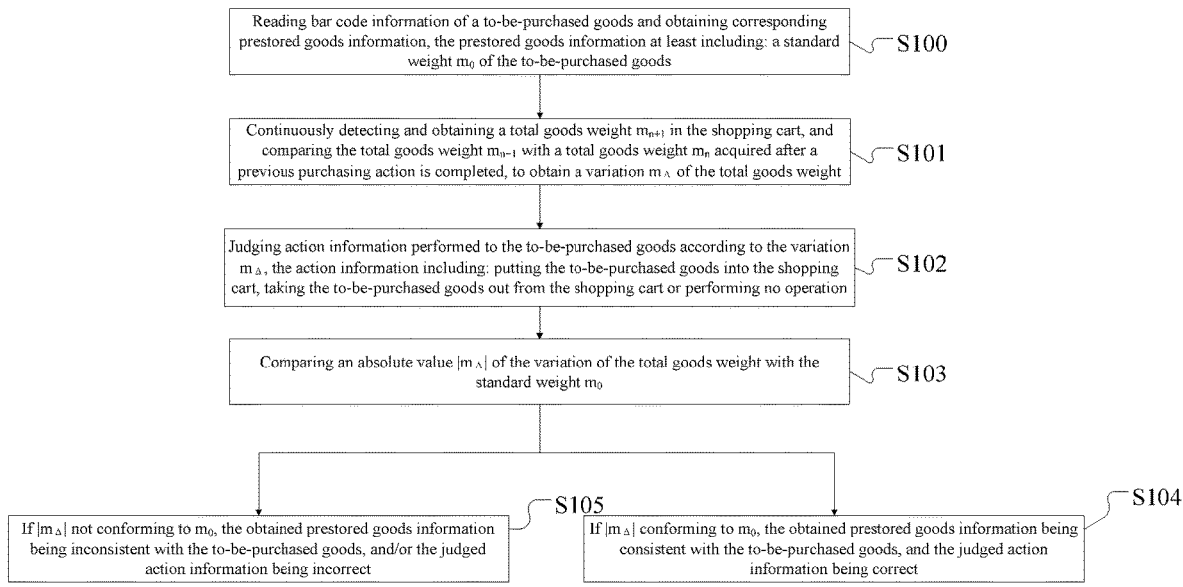
FIG. 1 is a schematic flow chart of a method for identifying goods of intelligent shopping cart of the present disclosure.

FIG. 1 is a schematic flow chart of a method for identifying goods of intelligent shopping cart of the present disclosure. The method for identifying goods of intelligent shopping cart of the present example includes the following steps:

S100: reading bar code information of goods to be purchased and obtaining corresponding prestored goods information, wherein the prestored goods information at least includes: a standard weight $m_0$ of the to-be-purchased goods; as the preferably example of the present disclosure, a value range of $m_0$ is $m_{min} \sim m_{max}$, wherein if $|m_A|$ is within the value range $m_{min} \sim m_{max}$ of $m_0$, then it is judged that $|m_A|$ conforms to $m_0$; if $|m_A|$ exceeds the value range $m_{min} \sim m_{max}$ of $m_0$, then it is judged that $|m_A|$ does not conform to $m_0$;

S101: continuously detecting and obtaining a total goods weight $m_{n+1}$ in the shopping cart, and comparing the total goods weight $m_{n+1}$ with a total goods weight $m_n$ which is acquired after a previous purchasing action is completed, to obtain a variation $m_A$ of the total goods weight;

S102: judging action information performed to the to-be-purchased goods according to the variation $m_A$, wherein the action information includes: putting the to-be-purchased goods into the shopping cart, taking the to-be-purchased goods out of the shopping cart, or no operation is performed;

S103: comparing an absolute value $|m_A|$ of the variation of the total goods weight with the standard weight $m_0$:

S104: if $|m_A|$ conforms to $m_0$, the obtained prestored goods information being consistent with the to-be-purchased goods, and the judged action information being correct;

S105: if $|m_A|$ does not conform to $m_0$, the obtained prestored goods information being inconsistent with the to-be-purchased goods, and/or the judged action information being incorrect.

As the preferably example of the present disclosure, the method further includes: the shopping cart provides with a weight sensor for continuously detecting the total goods weight in the shopping cart in real time, wherein the weight sensor, before acquiring the total goods weight, firstly determines a movement state of the shopping cart, and then calculates an actual total goods weight using a corresponding algorithm; and Starting to perform video recording for the shopping cart after the bar code information of the to-be-purchased goods is acquired, and tracking and analyzing the path of goods, wherein the video recording is stopped when it is judged that the to-be-purchased goods has been put into the shopping cart according to the variation of the total goods weight in the shopping cart; or the recording is stopped when a pre-set tracking time is ended.

As the preferably example of the present disclosure, a specific algorithm which the above weight sensor acquires the total goods weight is as follows:

3-1) when the shopping cart is stationary, a value acquired by the weight sensor is an actual total goods weight;

3-2) when the shopping cart moves stably, the data which appearance frequency is highest is taken as the actual total goods weight;

3-3) when the shopping cart moves vigorously, the values acquired by the weight sensor cannot be taken as the actual total goods weight;

3-4) when the movement state of the shopping cart turns to be stationary, drop off the data detected in the movement state and the value detected form the stationary state is taken as the actual total goods weight.

As the preferably example of the present disclosure, in a condition that that |mΔ| conforms to m0, for a to-be-purchased goods judged as being putting into the shopping cart, prestored information thereof is stored in a shopping list, and for a to-be-purchased goods judged as being taken out from the shopping cart, it is prompted to delete prestored information of the to-be-purchased goods from the shopping list.

As the preferably example of the present disclosure, in a condition that that |mΔ| does not conform to m0, an error is prompted, and the shopping cart is automatically locked.

As the preferably example of the present disclosure, according to the detected variation of the total weight of goods in the shopping cart, if it is judged that the to-be-purchased goods has been taken out from the shopping cart but the bar code information of the to-be-purchased goods is not acquired while the variation is detected or within a set period of time after the variation is detected, the shopping cart is located, and it is prompted that a code of the to-be-purchased goods should be scanned, meanwhile, the to-be-purchased goods is deleted from the shopping list, and after the bar code information is obtained or the to-be-purchased goods is put back into the shopping cart, the shopping cart is unlocked.

As the preferably example of the present disclosure, according to the detected variation of the total goods weight in the shopping cart, if it is judged that the to-be-purchased goods has been put into the shopping cart but the bar code information of the to-be-purchased goods is not acquired before the variation is detected, the shopping cart is locked and it is prompted to take out the to-be-purchased goods, and the shopping cart is unlocked after the goods is taken out.

As the preferably example of the present disclosure, in a precondition that the total goods weight in the shopping cart remains unchanged, when the bar code information of the to-be-purchased goods is read, and a corresponding standard weight is obtained, it is prohibited reading the bar code information within a set period of waiting time; when it is detected that a variation of an increase of the total goods weight in the shopping cart conforms to the standard weight, it is judged that the to-be-purchased goods is put into the shopping cart, and the prestored information of the to-be-purchased goods is stored in the shopping list.

As the method of the present example is adopted, when a customer himself puts a goods into the shopping cart during the shopping course, a system algorithm performs automatic identification, and records the correct goods in the shopping list, then the customer can directly settle the account after completing the shopping, therefore a lot of time for the customers to wait for the settlement can be saved, moreover, the number of customers in the supermarket is increased, meanwhile, the number of cashiers is decreased, the operating cost of the supermarket is reduced, and the kinds of incoming are increased.

Figure 2:
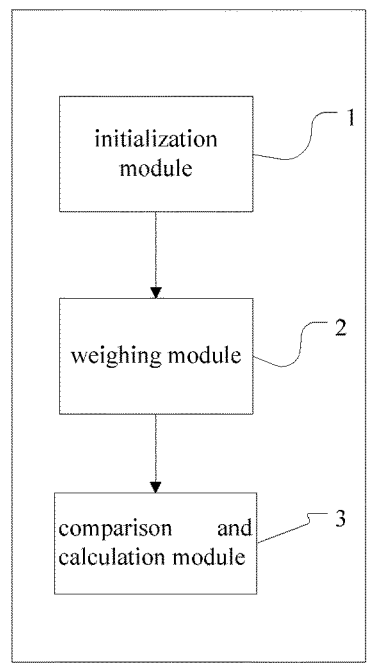
FIG. 2 is a structural schematic diagram of a system for identifying goods of intelligent shopping cart of the present disclosure.

FIG. 2 is a structural schematic diagram of a system for identifying goods of intelligent shopping cart of the present disclosure. The system for identifying goods of intelligent shopping cart includes: an initialization module 1, a weighing module 2, and a comparison and calculation module 3.

The initialization module 1 is configured to read bar code information of a to-be-purchased goods and obtain corresponding prestored goods information, wherein the prestored goods information at least includes: a standard weight $m_0$ of the to-be-purchased goods;

the weighing module 2 is configured to continuously detect and obtain a total weight $m_{n+1}$ of goods in the shopping cart, compare the total goods weight $m_{n+1}$ with a total goods weight $m_n$ acquired after a previous purchasing action is completed, to obtain a variation $m_A$ of the total goods weight, wherein action information performed to the to-be-purchased goods can be judged through the variation $m_A$, wherein the action information includes: putting the to-be-purchased goods into the shopping cart, taking the to-be-purchased goods out from the shopping cart or performing no operation;

the comparison and calculation module 3 is configured to compare an absolute value $|m_A|$ of the variation of the total goods weight with the standard weight $m_0$: if $|m_A|$ conforms to $m_0$, the obtained prestored goods information is consistent with the to-be-purchased goods, and the judged action information is correct; if $|m_A|$ does not conform to $m_0$, the obtained prestored goods information is inconsistent with the to-be-purchased goods, and/or the judged action information is incorrect.

Figure 3:
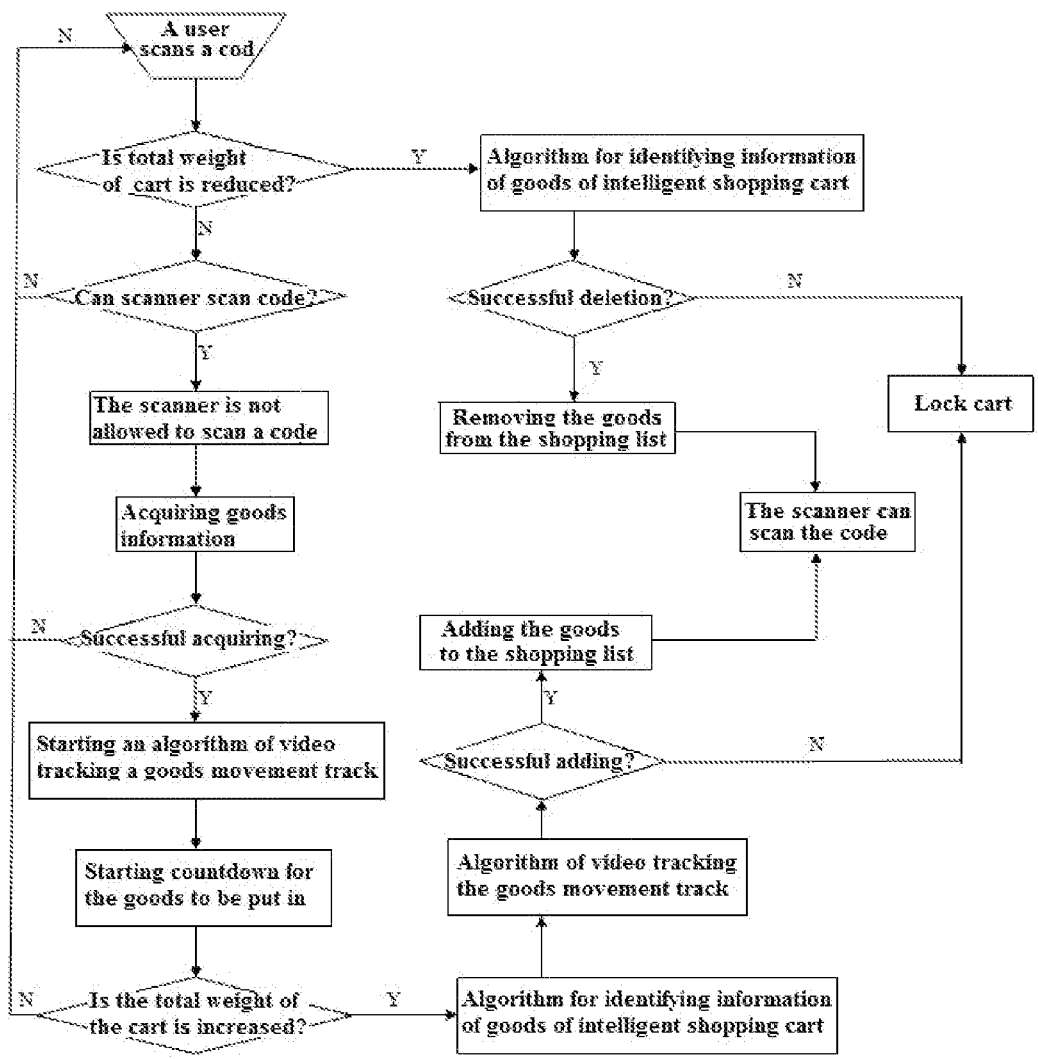
FIG. 3 is a flow chart of algorithm identification in an example of the present disclosure after a code scanning operation of a user.

FIG. 3 is a flow chart of algorithm identification in an example of the present disclosure after a code scanning operation of a user, and specific description is as follows:

The present example provides an algorithm for identifying goods information of intelligent shopping cart, wherein the shopping cart needs to be equipped with a weight sensor for monitoring a total goods weight in the shopping cart in real time, a one-dimension code scanner for reading bar code information of a to-be-purchased goods, a camera for acquiring videos and images of the goods, and a computer storing prestored information of all goods, wherein the computer monitors multi-path data, and can accurately identify whether obtained prestored goods information is consistent with the to-be-purchased goods upon comprehensive analysis, and whether action information to the goods is correctly judged, for example, mistaking, neglecting, and stealing of the goods in the shopping cart or like situations, and can prompt the user to re-scan a code and give an early warning to a backstage manager.

I. The algorithm for identifying goods information of intelligent shopping cart of the present example is implemented specifically according to the following steps:

Step 1. starting procedures of bar code reading, image acquisition, and weight data acquisition, wherein when the image acquisition is started, firstly an image of the shopping cart is acquired, and a quadrangular frame is drawn up along four sides of a basket in the image, as a warning frame A of the shopping cart;

Step 2. capturing, when the user takes no goods, that is, no goods appears in the shopping cart, by a camera mounted on a tablet computer, an image of the shopping cart at this time as a background image of next-time purchasing, wherein the image is recorded as a background image P1;

Step 3. reading bar code information of a to-be-purchased goods and obtaining corresponding prestored goods information, wherein the prestored goods information includes name, standard weight $m_0$, goods picture, goods specification, discount information of the to-be-purchased goods and etc., wherein a value range of the standard weight $m_0$ is $m_{min}$~$m_{max}$;

Step 4. performing image acquisition to capture an image, recorded as P2, including the to-be-purchased goods at this time, subtracting the background image P1 from the image P2 including a target goods, to obtain an initial region R1 of the target goods, wherein at this time, R1 is located in a basket range A of the shopping cart monitored by the camera, that is, R1 is included in A;

Step 5. next, tracking the region R1 in each frame of video by frame using a meanshift algorithm, wherein if the region R1 does not belong to A, then it is judged that the target goods is out of the range, and is not put into a shopping means of the smart shopping cart, and if R1 always belongs to A within a set period of time, then it is judged that the purchasing is successful, and the to-be-purchased goods has been put into the shopping means;

Step 6. continuously detecting, by a weight sensor provided on the shopping cart for continuously detecting the total goods weight in the shopping cart in real time, the total goods weight in the shopping cart in real time when the shopping cart is in an unlocked state.

it continuously detects and obtains the total goods weight $m_{n+1}$ in the shopping cart by the weight sensor, and compares the total goods weight $m_{n+1}$ with the total goods weight $m_A$ acquired after a previous purchasing action is completed, to obtain a variation $m_A$ of the total goods weight, wherein when $m_A>0$, it can be judged that the to-be-purchased goods is put into the shopping cart; when $m_A<0$, it can be judged that the to-be-purchased goods is taken out from the shopping cart; when $m_A=0$, it can be judged that no operation is performed to the to-be-purchased goods;

Step 7. comparing an absolute value $|m_A|$ of the variation with the standard weight $m_0$, wherein the absolute value $|m_A|$ is just an actual weight of the to-be-purchased goods:

3.1) if $|m_A|$ is within the value range $m_{min}$~$m_{max}$ of $m_0$, then it is judged that $|m_A|$ conforms to $m_0$, i.e. a goods identification result is: the obtained prestored goods information is consistent with the to-be-purchased goods, and the action information analyzed and judged from image acquisition is correct;

then, for a to-be-purchased goods judged as being putting into the shopping cart, prestored goods information thereof is stored in a shopping list; for a to-be-purchased goods judged as being taken out from the shopping cart, delete the prestored information of the to-be-purchased goods from the shopping list;

3.2) if $|m_A|$ exceeds the value range $m_{min}$~$m_{max}$ of $m_0$, then it is judged that $|m_A|$ does not conform to $m_0$, that is, a goods identification result is: the obtained prestored goods information is inconsistent with the to-be-purchased goods, and/or the judged action information is incorrect; then an error is prompted, and the shopping cart is automatically locked.

II. In the algorithm for identifying goods information of intelligent shopping cart of the present example, a process of acquiring the goods weight is continuously reading data of the weight sensor in real time at a preset frequency. However, when the shopping cart moves or is on an unlevel ground, the read weight data may be inconsistent with the actual weight of the to-be-purchased goods, and thus it cannot be taken as an identification basis of the to-be-purchased goods. Therefore, the weight sensor, before acquiring the total goods weight, firstly should judge a movement state of the shopping cart, then adopts corresponding algorithm according to different states of the shopping cart, and thus can accurately output the actual goods weight. The specific method is as follows:

2.1) before acquiring goods weight information, firstly judging whether the state of the shopping cart is a stationary state, a stable movement state, a vigorous movement state, or a state of turning from movement to be stationary:

A three-axis acceleration sensor is mounted on the shopping cart, and the shopping cart collects accelerations x, y and z of three axes in real time. it calculates the horizontal acceleration of shopping cart according to the principle of acceleration decomposition. When the acceleration is less than a certain value, the shopping cart is stationary. When acceleration is greater than a certain value, the shopping cart is in movement state.

2.2) based on the tests, it can be found that the weight sensor has different methods of acquiring data for the shopping cart in different states, specifically as follows:

1) when the shopping cart is stationary, a value acquired by the weight sensor is an actual total goods weight;

2) when the shopping cart moves stably, the data which appearance frequency is highest is taken as the actual total goods weight;

3) when the shopping cart moves vigorously, the values acquired by the weight sensor cannot be taken as the actual total goods weight;

4) when the movement state of the shopping cart turns to be stationary, drop off the data detected in the movement state and the value detected form the stationary state is taken as the actual total goods weight.

Figure 4:
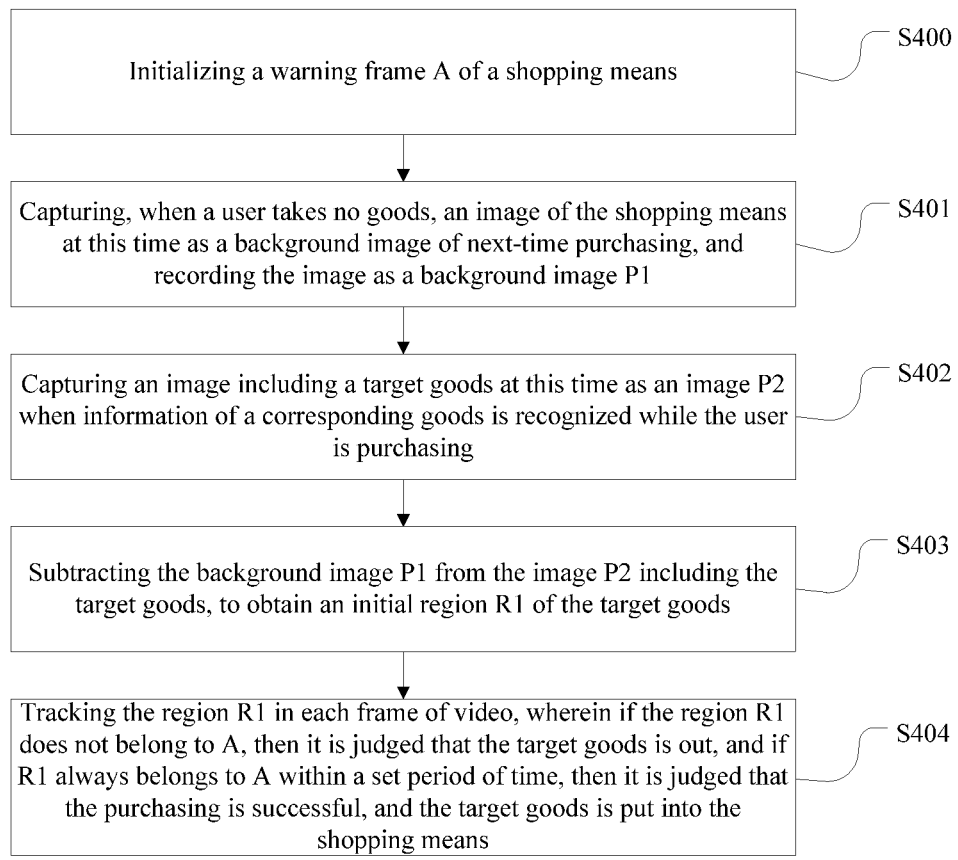
FIG. 4 is a schematic flow chart of a video tracking method in the present disclosure.

FIG. 4 is a schematic flow chart of a video tracking method in the present disclosure. After the bar code information of the to-be-purchased goods is acquired, image acquisition and the following analysis are performed on a use state of the shopping cart:

S400: initializing the warning frame A of the shopping means,

S401: capturing, when the user takes no goods, an image of the shopping means at this time as a background image of next-time purchasing, and recording the image as a background image P1, S402: capturing an image including a target goods at this time as an image P2 when information of a corresponding goods is recognized while the user is purchasing, S403: subtracting the background image P1 from the image P2 including the target goods, to obtain an initial region R1 of the target goods, S404: tracking the region R1 in each frame of video, wherein if the region R1 does not belong to A, then it is judged that the target goods is out, and if R1 always belongs to A within a set period of time, then it is judged that the purchasing is successful, and the target goods is put into the shopping means.

Specifically, the video tracking method includes the following flow:

III. A camera is further mounted on the shopping cart, and after the bar code information of the to-be-purchased goods is acquired, it starts to carry out image acquisition on the use state of the shopping cart for analysis.

1. A monitoring device is placed in a position where an image inside the basket of the shopping cart can be captured, and the algorithm is started after a touch-screen computer receives that the user has scanned a code. Firstly, a quadrangular frame is drawn up along four sides of the shopping means in the image of the touch-screen computer as a warning frame A of the shopping means.

2. The monitoring device mounted on the touch-screen computer captures an image of the shopping means at this time as a background image of next-time purchasing when the user takes no goods, that is, no goods appears on the shopping means, wherein the image is recorded as a background image P1.

3. When the user is purchasing, the user scans a bar code printed on a goods which needs to be purchased in an infrared scanning area in the front of the touch-screen computer, and when an infrared barcode scanner scans the bar code or QR code and recognizes information of this goods, the monitoring means on the smart shopping cart captures an image including the target goods at this time, which image is recorded as P2.

4. The background image P1 is subtracted from the image P2 including the target goods to obtain an initial region R1 of the target goods, at which time, R1 is within the basket range A of the shopping cart monitored by the monitoring means, that is, R1 is included in A.

5. Next, the region R1 in each frame of video is tracked using a meanshift algorithm frame by frame, wherein if the region R1 does not belong to A, then it is judged that the target goods is out, and is not put into the shopping means of the intelligent shopping cart, and if R1 always belongs to A within a set period of time, then it is judged that the purchasing is successful, and the target goods has been put into the shopping means.

If both weight algorithm and video algorithm identify that the goods has been put into the shopping means, then the goods is added to the shopping list of the touch-screen computer;

If both the weight algorithm and the video algorithm identify that the goods has been taken out from the shopping means, then the goods is deleted from the shopping list of the touch-screen computer;

If identification results of the weight algorithm and the video algorithm are inconsistent, the touch-screen computer prompts the user to re-operate.

In this way, cases such as misplacing and stealing of the goods are completely eliminated, and when an abnormal action is monitored, the tracking video also will be sent to a security module. When the image feature data stored in the goods pre-stored database is not sufficient, comparison and calculation module 3 of the shopping cart cannot accurately determine whether the disposition for the goods is correct.

In specially, the security directly blocks the goods and locks the cart while the configuration of the goods does not consist with the configuration thereof in the server, and informs that the check for the goods is fail, and the user need to pick the goods out of the cart and buy it again.

The comparison and calculation module 3 allows the user to buy the goods and to inform an alarm of goods from the cart to the server to wait for the dispose form the administrator while the configuration of the goods consists with the configuration thereof in the server wherein the alarm information includes: goods name, bar code, and the continuous picture of the goods putted into the cart. The comparison and calculation module 3 inform an alarm of goods from the cart to the server and confirm whether the disposition for the goods is correct according to the alarm information of the goods; and forbids the payment of the goods and inform to take out the goods if the confirmation for the disposition for the goods is abnormal.

The comparison and calculation module 3 is used for receiving the abnormal alarm information of the cart and providing a handle interface for the administrator.

In the above, a time of stopping video recording is controlled in any one of the following methods: a first method is that when it is judged according to the variation of the total goods weight in the shopping cart that the to-be-purchased goods has been put into the shopping cart or the to-be-purchased goods has been taken out from the shopping cart, the video recording can be stopped; a second method is that a tracking time of one goods is pre-set, and the video recording is stopped when the pre-set tracking time is ended.

IV. Processing methods for several common situations are as follows:

a. when it is judged according to the detected variation of the total goods weight in the shopping cart that the to-be-purchased goods has been taken out from the shopping cart, but the bar code information of the to-be-purchased goods is not acquired all the time while the variation is detected, or within a set period of time after the total goods weight is changed, it means that the user does not scan the code of the to-be-purchased goods while or after taking out the to-be-purchased goods.

A processing method is as follows: automatically locking the shopping cart, prompting to scan the code of the to-be-purchased goods, and deleting the to-be-purchased goods from the shopping list; after the bar code information of the to-be-purchased goods is acquired or the to-be-purchased goods is put back into the shopping cart, automatically unlocking the shopping cart;

b. when it is judged according to the detected variation of the total goods weight in the shopping cart that the to-be-purchased goods has been put into the shopping cart, but the bar code information of the to-be-purchased goods is not acquired before the total goods weight is changed, it means that the user does not scan the code of the to-be-purchased goods before putting in the to-be-purchased goods.

A processing method is as follows: locking the shopping cart, prompting to take out the to-be-purchased goods, and unlocking the shopping cart after the goods is taken out;

c. when it is detected that the total goods weight of the shopping cart is not changed all the time, but the bar code information of the to-be-purchased goods, and prestored information thereof such as the standard weight are acquired, it means that the user is to put this to-be-purchased goods into the shopping cart.

A processing method is as follows: prohibiting reading bar code information of other to-be-purchased goods within a set period of waiting time, and directly storing prestored information of the to-be-purchased goods into the shopping list when it is detected that the variation of the total goods weight in the shopping cart conforms to the standard weight;

d. when it is judged according to the detected variation of the total goods weight in the shopping cart that the to-be-purchased goods has been put into the shopping cart, but it is obtained by the tracking algorithm upon analysis of the movement path of the goods that the scanned goods is not put into the shopping cart, it means that the user replaces the goods.

A processing method is: locking the shopping cart, prompting to take out the to-be-purchased goods, and unlocking the shopping cart after the goods is taken out;

e. cases that the user cannot scan a code: 1) the code cannot be scanned when the shopping cart is locked; 2) the code cannot be scanned during a set period of time of waiting for the goods to be put in after the bar code information of the goods is acquired. When it is judged according to the algorithm that the user is allowed to scan a code, it will firstly inquire, after the bar code information is acquired, whether the goods is taken out from the shopping cart.

Cases that the shopping cart is automatically locked: 1) when it is being detected whether a goods in the shopping cart is replaced; 2) if no code is scanned before the to-be-purchased goods is put in; 3) if no code is scanned after the to-be-purchased goods is taken out.

Example

As shown in the flow chart of algorithm identification of FIG. 1:

after a user scans a code of a goods, a variation of a total goods weight of intelligent shopping cart is detected immediately, and it is detected whether the total goods weight is reduced;

1.1) if the total goods weight in the shopping cart is reduced, the variation $m_\Delta$ detected at this time is compared with a standard weight $m_0$ when this goods is put in. If the variation $m_\Delta$ is within a value range $m_{min} \sim m_{max}$ of $m_0$, then it is deemed that this goods is taken out, and this goods can be deleted; otherwise, the shopping cart is locked and the user is prompted to re-scan the code of the goods just taken out.

1.2) If the total goods weight in the shopping cart is unchanged, when the shopping cart is in a state that the code can be scanned, a server can be requested to acquire goods information, and image acquisition is started to analyze and track a goods movement path, with counting down for waiting for the goods to be put in. Since the shopping cart does not allow code re-scanning, and code re-scanning is not allowed when the shopping cart is locked, when the above mentioned shopping cart is in the state that the code can be scanned, it means that the goods, of which the code has been scanned, is to be put into the shopping cart. During the above time of waiting for the goods to be put in, when the total goods weight in the shopping cart is detected to be increased, then it starts to identify information of goods in the shopping cart, and the goods is identified in combination with results of analysis upon image acquisition. If the identification is successful, the goods is added to the shopping list, while if the goods is not successfully added, the shopping cart is locked, and after a misoperation of the user is eliminated, the shopping cart can be unlocked.

While the present disclosure is described with specific structural features and/or method actions, it can be understood that the present disclosure defined in the claims is not necessarily limited to the above specific features or actions. Instead, the above specific features or actions are merely disclosed as exemplary forms of implementing the claims.

What is claimed is:

1. A method for identifying goods of intelligent shopping cart, comprising the following steps:

reading bar code information of a to-be-purchased goods and obtaining corresponding prestored goods information, the prestored goods information at least comprising: a standard weight $m_0$ of the to-be-purchased goods;

continuously detecting and obtaining a total goods weight $m_{n+1}$ in the shopping cart, and comparing the total goods weight $m_{n+1}$ with a total goods weight $m_n$ acquired after a previous purchasing action is completed, to obtain a variation $m_\Delta$ of the total goods weight, wherein an action information is judged through the variation $m_\Delta$, and the action information indicates that an action is performed to the to-be-purchased goods, the action comprises: putting the to-be-purchased goods into the shopping cart, taking the to-be-purchased goods out from the shopping cart or performing no operation;

comparing an absolute value $|m_\Delta|$ of the variation of the total goods weight with the standard weight $m_0$:

if $|m_\Delta|$ conforms to $m_0$, the obtained prestored goods information is consistent with the to-be-purchased goods, and the action information being correct;

if $|m_\Delta|$ does not conform to $m_0$, the obtained prestored goods information is inconsistent with the to-be-purchased goods, and/or the action information being incorrect;

providing on the shopping cart a weight sensor for continuously detecting the total goods weight in the shopping cart in real time, wherein the weight sensor, before acquiring the total goods weight, firstly determines a movement state of the shopping cart, and then calculates an actual total goods weight using a corresponding algorithm; and starting to perform, after the bar code information of the to-be-purchased goods is acquired, video recording for the shopping cart, and tracking and analyzing a goods path, wherein the video recording is stopped when it is judged according to the variation of the total goods weight in the shopping cart that the to-be-purchased goods has been put into the shopping cart; or the recording is stopped when a pre-set tracking time is ended;

wherein a specific algorithm for the weight sensor to acquire the total goods weight is set as follows:

3-1) when the shopping cart is stationary, a value acquired by the weight sensor as the actual total goods weight;

3-2) when the shopping cart moves stably, an average of N weight data acquired by the weight sensor as the actual total goods weight;

3-3) when the shopping cart moves vigorously, the value acquired by the weight sensor cannot be the actual total goods weight;

3-4) when the shopping cart turns from a movement state to be stationary, and the weight sensor acquires no less than six continuous same values, the value as the actual total goods weight.

2. The method for identifying goods of intelligent shopping cart of claim 1, wherein a value range of the $m_0$ is $m_{min}\sim m_{max}$, wherein if $|m_A|$ is within the value range $m_{min}\sim m_{max}$ of the $m_0$, then it is judged that $|m_A|$ conforms to $m_0$; if $|m_A|$ exceeds the value range $m_{min}\sim m_{max}$ of the $m_0$, then it is judged that $|m_A|$ does not conform to $m_0$.

3. The method for identifying goods of intelligent shopping cart of claim 2, wherein in a condition that that $|m_A|$ conforms to $m_0$, for a to-be-purchased goods judged as being putting into the shopping cart, prestored information thereof is stored in a shopping list, and for a to-be-purchased goods judged as being taken out from the shopping cart, it is prompted to delete prestored information of the to-be-purchased goods from the shopping list;

in a condition that that $|m_A|$ does not conform to $m_0$, an error is prompted, and the shopping cart is automatically locked.

4. The method for identifying goods of intelligent shopping cart of claim 1, wherein after the bar code information of the to-be-purchased goods is acquired, image acquisition and the following analysis are performed on a use state of the shopping cart:

initializing a warning frame A of a shopping means, capturing, when a user takes no goods, an image of the shopping means at this time as a background image of next-time purchasing, and recording the image as a background image P1, capturing an image including a target goods at this time as an image P2 when information of a corresponding goods is recognized while the user is purchasing, subtracting the background image P1 from the image P2 including the target goods, to obtain an initial region R1 of the target goods, tracking the region R1 in each frame of video, wherein if the region R1 does not belong to A, then it is judged that the target goods is out, and if R1 always belongs to A within a set period of time, then it is judged that purchasing is successful, and the target goods is put into the shopping means.

5. The method for identifying goods of intelligent shopping cart of claim 1, wherein when it is judged according to the detected variation of the total goods weight in the shopping cart that the to-be-purchased goods has been taken out from the shopping cart, but bar code information of the to-be-purchased goods is not acquired while the variation is detected or within a set period of time thereafter, the shopping cart is locked, and it is prompted to scan a code of the to-be-purchased goods, and the same is deleted from the shopping list, and after the bar code information is acquired or the to-be-purchased goods is put back into the shopping cart, the shopping cart is unlocked.

6. The method for identifying goods of intelligent shopping cart of claim 1, wherein when it is judged according to the detected variation of the total goods weight in the shopping cart that the to-be-purchased goods has been put into the shopping cart, but the bar code information of the to-be-purchased goods is not acquired before the variation is detected, the shopping cart is locked and it is prompted to take out the to-be-purchased goods, and the shopping cart is unlocked after the goods is taken out.

7. The method for identifying goods of intelligent shopping cart of claim 1, wherein in a precondition that the total goods weight in the shopping cart remains unchanged, when the bar code information of the to-be-purchased goods is read, and a corresponding standard weight is obtained, it is prohibited reading the bar code information within a set period of waiting time; when it is detected that a variation of an increase of the total goods weight in the shopping cart conforms to the standard weight, it is judged that the to-be-purchased goods is put into the shopping cart, and prestored information of the to-be-purchased goods is stored in the shopping list.

8. A system for identifying goods of intelligent shopping cart, comprising: an initialization module, a weighing module, and a comparison and calculation module, wherein the initialization module is configured to read bar code information of a to-be-purchased goods and obtain corresponding prestored goods information, wherein the prestored goods information at least comprises: a standard weight $m_0$ of the to-be-purchased goods;

the weighing module is configured to continuously detect and obtain a total goods weight $m_{n+1}$ in the shopping cart, compare the total goods weight $m_{n+1}$ with a total goods weight $m_n$ acquired after a previous purchasing action is completed, to obtain a variation $m_A$ of the total goods weight, wherein an action information is judged through the variation $m_A$, the action information indicates that an action is performed to the to-be-purchased goods, the action comprising: putting the to-be-purchased goods into the shopping cart, taking the to-be-purchased goods out from the shopping cart or performing no operation;

the comparison and calculation module is configured to compare an absolute value $|m_A|$ of the variation of the total goods weight with the standard weight $m_0$:

if $|m_A|$ conforms to $m_0$, the obtained prestored goods information is consistent with the to-be-purchased goods, and the action information is correct;

if $|m_A|$ does not conform to $m_0$, the obtained prestored goods information is inconsistent with the to-be-purchased goods, and/or the action information is incorrect;

the system further comprising a weight sensor provided on the shopping cart for continuously detecting the total goods weight in the shopping cart in real time, wherein the weight sensor, before acquiring the total goods weight, firstly determines a movement state of the shopping cart, and then calculates an actual total goods weight using a corresponding algorithm;

wherein a specific algorithm for the weight sensor to acquire the total goods weight is set as follows:

3-1) when the shopping cart is stationary, a value acquired by the weight sensor as the actual total goods weight;

3-2) when the shopping cart moves stably, an average of N weight data acquired by the weight sensor as the actual total goods weight;

3-3) when the shopping cart moves vigorously, the value acquired by the weight sensor cannot be the actual total goods weight;

3-4) when the shopping cart turns from a movement state to be stationary, and the weight sensor acquires no less than six continuous same values, the value as the actual total goods weight.

9. The system for identifying goods of intelligent shopping cart of claim 8, further comprising:
a security module configured to block the goods and lock the cart while a configuration of the goods does not consist with those in the server; to inform an alarm of goods from the cart to the server and confirm whether a disposition for the goods is correct according to the alarm information of the goods while the configuration of the goods consists with those in the server; and to forbid a payment of the goods and inform to take out the goods from the cart if the confirmation for the disposition for the goods is abnormal.

* * * * *